(12) United States Patent
Tong

(10) Patent No.: US 10,456,927 B2
(45) Date of Patent: Oct. 29, 2019

(54) HANDLING ROBOT CONTROL SYSTEM

(71) Applicant: Guosong Ge, Jinhua (CN)

(72) Inventor: Yingtao Tong, Ningbo (CN)

(73) Assignee: Guosong Ge, Jinhua, Zhejiang Province (CN)

( * ) Notice: Subject to any disclaimer, the term of this patent is extended or adjusted under 35 U.S.C. 154(b) by 0 days.

(21) Appl. No.: 16/234,605

(22) Filed: Dec. 28, 2018

(65) Prior Publication Data

US 2019/0126492 A1 May 2, 2019

(51) Int. Cl.
| | | |
|---|---|---|
| B25J 15/02 | (2006.01) | |
| F16H 19/04 | (2006.01) | |
| F16H 1/10 | (2006.01) | |
| F16H 1/14 | (2006.01) | |
| B25J 5/00 | (2006.01) | |
| B25J 9/02 | (2006.01) | |
| B25J 9/10 | (2006.01) | |
| B25J 9/12 | (2006.01) | |
| B25J 9/16 | (2006.01) | |
| B25J 19/02 | (2006.01) | |

(52) U.S. Cl.
CPC ............ B25J 15/026 (2013.01); B25J 5/007 (2013.01); B25J 9/02 (2013.01); B25J 9/102 (2013.01); B25J 9/12 (2013.01); B25J 9/16 (2013.01); B25J 9/1679 (2013.01); B25J 19/021 (2013.01); F16H 1/10 (2013.01); F16H 1/14 (2013.01); F16H 19/04 (2013.01)

(58) Field of Classification Search
CPC ..... B25J 5/007; B25J 9/02; B25J 9/102; B25J 9/12; B25J 9/16; B25J 9/1679; B25J 15/026; B25J 19/021; F16H 1/10; F16H 1/14; F16H 19/04
See application file for complete search history.

(56) References Cited

U.S. PATENT DOCUMENTS

2011/0071677 A1    3/2011    Stilman

FOREIGN PATENT DOCUMENTS

CN        106965159         7/2017

OTHER PUBLICATIONS

First Office Action for Chinese Counterpart Application 201810612876.X dated Nov. 20, 2018.
Notification of Grant for Chinese Counterpart Application 201810612876.X dated Dec. 13, 2018.

*Primary Examiner* — Saul Rodriguez
*Assistant Examiner* — Brendan P Tighe

(57) ABSTRACT

The invention discloses a handling robot control system, comprising a base, an air balance cavity set in the base, an air pump fixedly arranged at the middle of the air balance cavity, air valves symmetrically disposed in two sides of the end walls of the air balance cavity, The handling robot may confirm the position of the cargoes and the the position where the cargoes will be placed through the infrared detector, and control the inner motor to drive the movement, rotation, lifting and handling of the device; during the movement, the balance and stability of the device may be maintained through the adjustment of the air pressure when it moves on the rugged road surface, and through the transmission of the coupling and the connecting shaft, the device may continue to move when it maintains balance, so that the stability may be maintained when the cargoes are carried.

5 Claims, 4 Drawing Sheets

HANDLING ROBOT CONTROL SYSTEM

CROSS-REFERENCES TO RELATED APPLICATIONS

The present application claims priority from Chinese application No. 201810612876X filed on Jun. 14, 2018 which is hereby incorporated by reference in its entirety.

TECHNICAL FIELD

The invention relates to the technical field of handling, in particular to a handling robot control system.

BACKGROUND OF THE INVENTION

Handling is regular in industrial production or in life, handling can be carried out as long as the goods are moved. The large-scale instrument and the manual work are often required to be coordinated for the large-quantity and heavy-weight cargos, but large-scale mechanical devices covers large areas, and handling cannot be completed independently. The body of handling robots at the present are fixed at one place and are used for carrying out cargo handling according to the rotation and the adjustment of length and height of the mechanical arm. However, the handling cost is increased and the handing range is small for the small and large quantitites of goods. Moreover, the movable handling devices at the present have poor stability in the moving process, and has poor adaptability to the road surface, and it can only move on a smooth road surface, so that the device may not be applicable on a large scale, but the device can solve this problem.

BRIEF SUMMARY OF THE INVENTION

The purpose of the invention is to provide a handling robot control system so as to overcome the problems existing in the above background art.

To achieve the above aim, the following technical plan is adopted by the invention: a handling robot control system comprises a base, an air balance cavity set in the base, an air pump fixedly arranged at the middle of the air balance cavity, air valves symmetrically disposed in two sides of the end walls of the air balance cavity, pistons symmetrically disposed in two sides of the air balance cavity, wherein piston rods are fixedly set at the middle of the lower end faces of the pistons, wherein the lower end faces of the piston rods penetrate through the base and extend into the outer space and are fixedly connected with a support block, and one end face, which is close to the air pump, of the support block is rotationally connected with a rotating shaft, wherein a scroll wheel is fixedly set on the rotating shaft; a fixed block fixedly set at the middle of the lower end face of the base, wherein a first transmission cavity is set in the fixed block, wherein a driving motor is fixedly disposed in the first transmission cavity, wherein a first bevel gear is fixedly arranged on the lower end face of an output shaft in the driving motor, wherein a second bevel gear is engaged with and set on the one end face of the first bevel gear; wherein a rotating rod penetrates through and is set on the second bevel gear; connection cavities with the opening towards outside are symmetrically disposed in two sides of the first transmission cavity; wherein the two end faces of the rotating rod respectively penetrate through the first transmission cavity and stretch into the connection cavitives and are fixedly connected with couplings respectively; wherein one end, away from the first transmission cavity, of the coupling, is fixedly connected with a connecting shaft; spring grooves symmetrically set in two sides of the base on the upper side of the fixed block, wherein a slider is set in the spring groove; a compression spring fixedly arranged on the upper end face of the slider, wherein the other end of the compression spring is fixedly connected to the upper end face of the spring groove; wherein a connection rod is fixedly set at the middle of the lower end face of the slider, wherein a connection block is fixedly connected to the lower end face of the connection rod, wherein a communicated cavity with an opening facing downwards is set in the connection block, wherein communicated first slots are symmetrically disposed in the connection block; wherein one end, away from the coupling, of the connecting shaft, penetrates through the first slot and the cavity and is rotationally connected with the connection block through a bearing; a first gear fixedly set on the connecting shaft, wherein a second gear is engaged with and is set on the lower end face of the first gear; a second slot which communicates with two sides arranged on the lower side of the first slot, wherein one end, close to the fixed block, of the rotating shaft, penetrates through the second slot and the second gear and is rotationally connected with the connection block through a bearing; first grooves with upward openings symmetrically disposed in the two sides of the upper end face of the base, wherein a first fixed rod is fixedly set between two end walls of the first grooves; a first rotating handle rotationally connected to the first fixed rod; a first sliding groove arranged between the first grooves; a first slide rail fixedly set on the lower end wall of the first sliding groove, wherein first sliders in slide fit are symmetrically disposed in two sides of the first slide rail, wherein a second rotating handle is rotationally connected to the first slider; a guide chute communicated with the one side of the first sliding groove; a sliding groove communicated with the one side of the guide chute; a first slide rack fixedly set on the one end face of the first slider on the one side; a second slide rack fixedly set on the one end face of the first slider on the other side, wherein a mesh gear driven by a motor is engaged between the one end face of the second slide rack and the other end face of the second slide rack.

Preferably, a machine body is set on the upper side of the base, wherein second grooves with downward openings are symmetrically disposed in two sides of the lower end wall of the machine body, wherein a second fixed rod is fixedly set between the two end walls of the second groove; a third rotating handle is rotationally connected to the second fixed rod, and a second sliding groove is arranged between the second grooves, wherein the upper end wall of the second sliding groove is fixedly provided with a second slide rail, and symmetrical second sliders are in slide fit with the second slide rail, and a fourth rotating handle is rotationally connected to the second slider; the first rotating handle is rotationally connected with the fourth rotating handle through a connection rotating handle, and the second rotating handle is rotationally connected with the third rotating handle through a connection rotating handle; a turning motor is fixedly set in the upper end face of the machine body; a rotary body is set on the upper side of the machine body, wherein an inner tooth space is set in the rotary body, and a turning gear is engaged with the inner tooth space; a turning shaft is fixed to the upper end face of an output shaft in the turning motor, wherein the upper end face of the turning shaft penetrates through the rotary body, and stretches into the inner tooth space and is fixedly connected with the turning gear; a slide cavity is set on the upper side of the inner tooth space, and a slide fixed rod is fixedly arranged between two end walls of the slide cavity, wherein symmetrical moving blocks are in sliding fit connection with the slide fixed rod, wherein Z-shaped clamping plates are fixedly set on the end faces of the two moving blocks; a first toothed rack extending towards one side is fixedly arranged on the upper end face of the the moving block on the one side, and a second fixed block is fixedly set on the upper end face of the moving block on the other side, wherein a second toothed rack extending towards one side is fixedly set on the one end face of the second fixed block; a transmission block is fixedly set at the middle of the upper end wall of the slide cavity, and a transmission groove which penetrates from one side to the other side is set in the transmission block; a transmission gear is set in the transmission groove; a transmission motor is fixedly set in the upper end wall of the slide cavity; a rotary shaft is fixedly connected to the lower end face of an output shaft in the transmission motor, wherein the lower end face of the rotary shaft penetrates through the transmission gear and is rotationally connected with the lower end wall of the transmission groove; the one end face of the first toothed rack engages with the one end face of the transmission gear, and the one end face of the second toothed rack engages with the other end face of the transmission gear; a binding post is fixedly set on the upper end face of the rotary body, wherein a stabilizing block is fixedly arranged on the binding post, and an infrared detector is fixedly disposed on the stabilizing block; a heat dissipating groove is communicated with the upper side of the slide cavity, wherein the heat dissipating groove communicates with the slide cavity and the outer space, wherein a cooling fin is fixedly set in the heat dissipating groove, and a dust filter gauze is fixedly set on the upper side of the cooling fin.

Preferably, the height of the Z-shaped clamping plates is equal to the height between the slide fixed rod and the ground when the lower end face of the machine body abuts against the upper end face of the base; slide-proof rugs are fixedly arranged on the opposite end faces of the symmetrical Z-shaped clamping plates.

Preferably, a plurality of ball grooves are set in the end face where the machine body abuts against the rotary body, wherein the ball grooves are provided with balls.

Preferably, when in the initial state, the connecting shaft and the coupling are fixedly connected to each other but are in a relaxed state.

DETAILED DESCRIPTION OF THE INVENTION

The technical proposal in the present invention embodiments are clearly and completely described in the following with reference to the drawings to be used in the description of the embodiments in this invention. Obviously, the described embodiments are only a part of the embodiments of the present invention rather than all embodiments. All other embodiments obtained by persons of ordinary skill in the art based on the embodiment of the present invention without creative efforts shall fall within the protection scope of the present invention.

Figure 1:
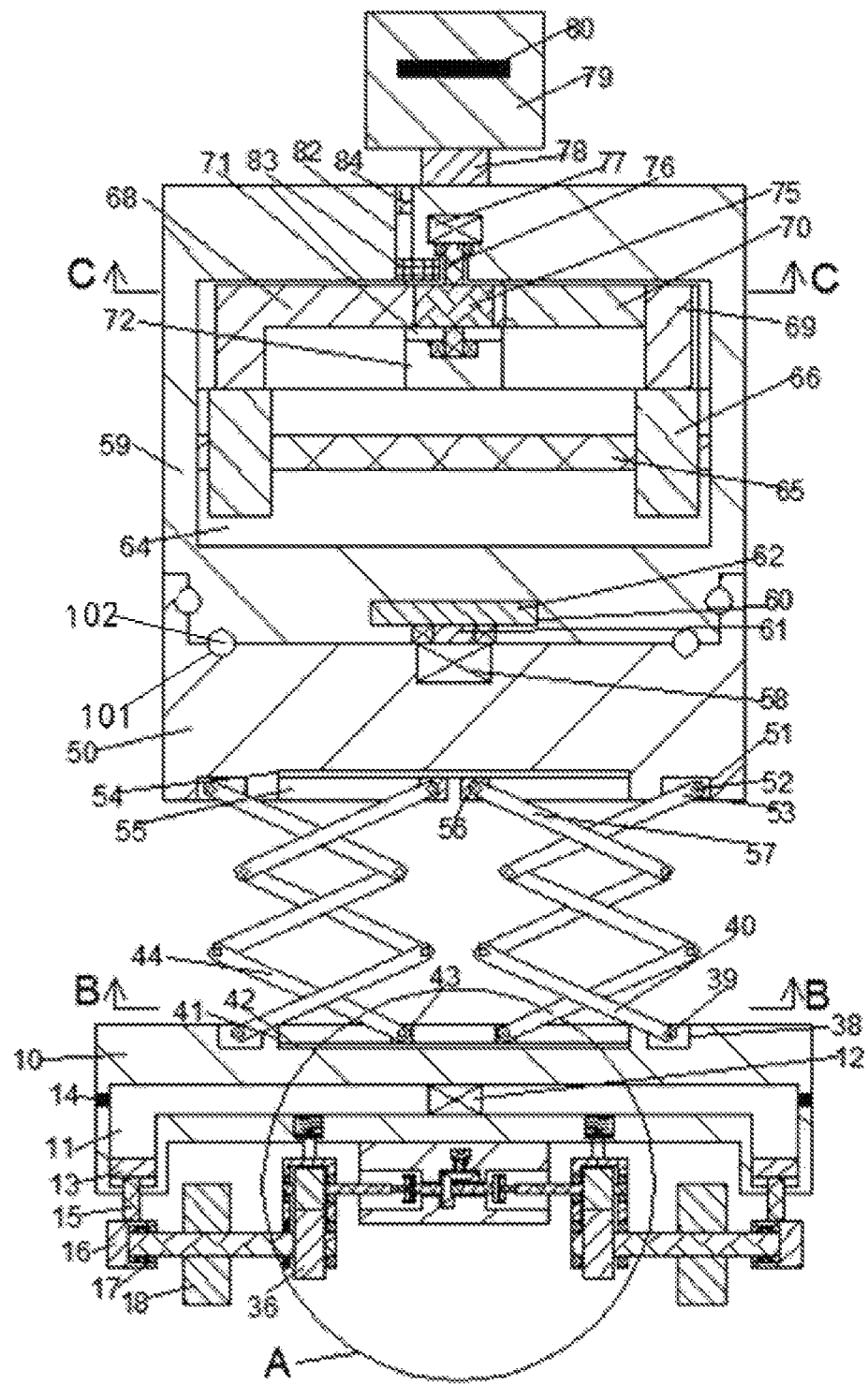
FIG. 1 is a front-view schematic structural diagram showing the full section of a handling robot control system in this invention.
Figure 2:
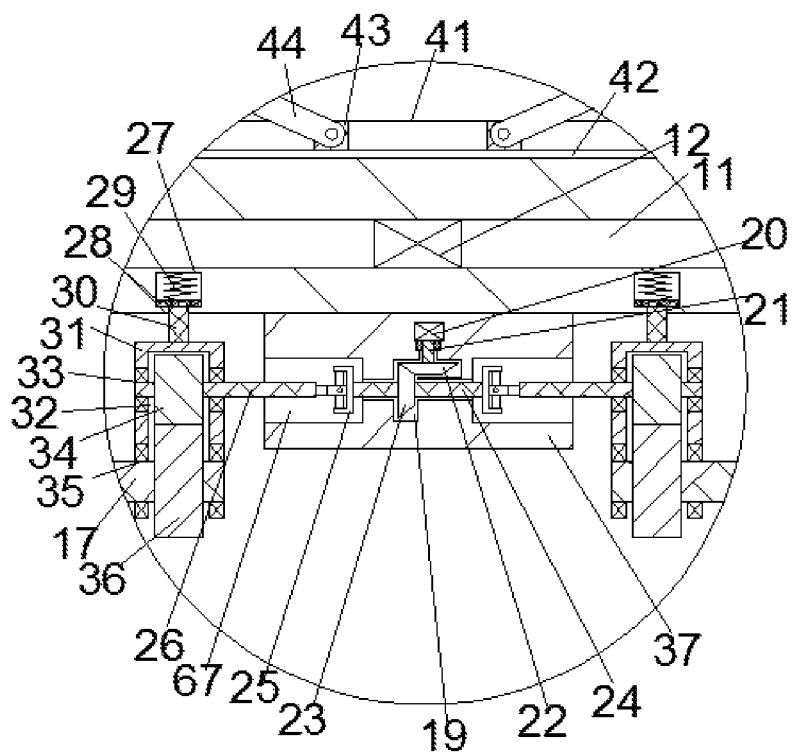
FIG. 2 is an enlarged schematic structural diagram of A of a handling robot control system in this invention.
Figure 3:
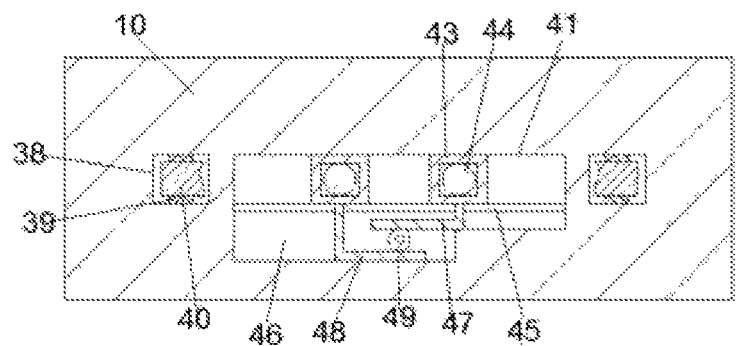
FIG. 3 is a schematic structural diagram along "B-B" direction of a handling robot control system in this invention.
Figure 4:
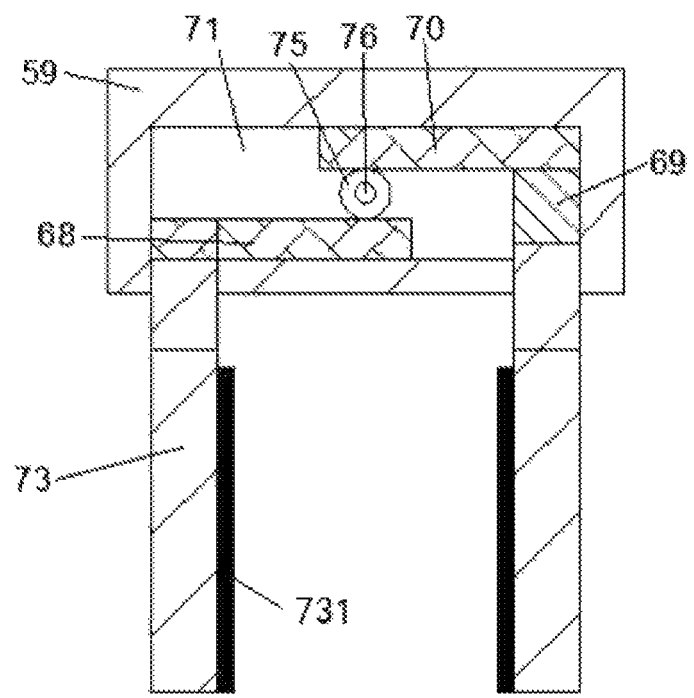
FIG. 4 is a schematic structural diagram along "C-C" direction of a handling robot control system in this invention.
Figure 5:
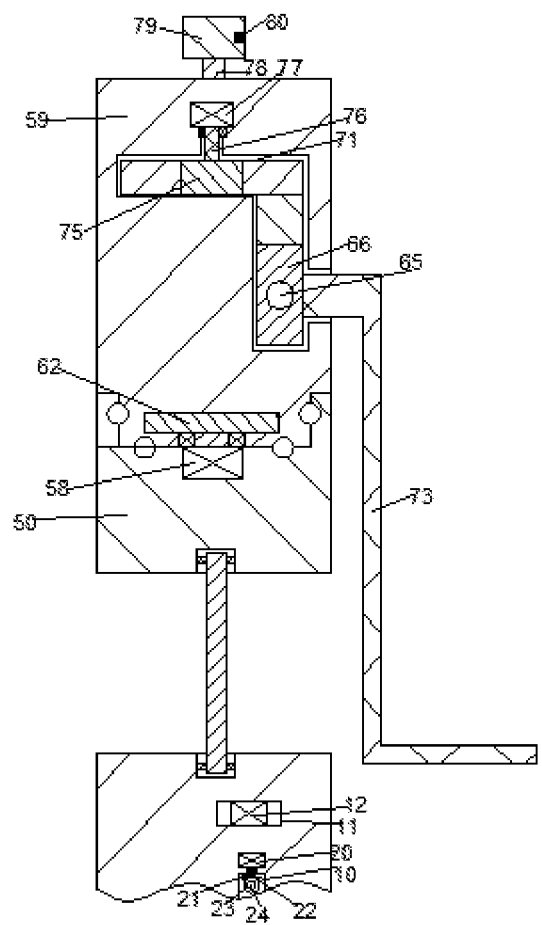
FIG. 5 is a left-view schematic structural diagram showing the full section of a handling robot control system in this invention.

Referring to the FIG. 1-FIG. 5, an embodiment of this invention: a handling robot control system comprises a base 10; an air balance cavity 11 set in the base 10; an air pump 12 fixedly arranged at the middle of the air balance cavity 11; air valves 14 symmetrically disposed in two sides of the end walls of the air balance cavity 11; pistons 13 symmetrically disposed in two sides of the air balance cavity 11, wherein piston rods 15 are fixedly set at the middle of the lower end faces of the pistons 13, wherein the lower end faces of the piston rods 15 penetrate through the base 10 and extend into the outer space and are fixedly connected with a support block 16, and one end face, which is close to the air pump 12, of the support block 16 is rotationally connected with a rotating shaft 17, wherein a scroll wheel 18 is fixedly set on the rotating shaft 17; a fixed block 37 fixedly set at the middle of the lower end face of the base 10, wherein a first transmission cavity 19 is set in the fixed block 37, wherein a driving motor 20 is fixedly disposed in the first transmission cavity 19, wherein a first bevel gear 22 is fixedly arranged on the lower end face of an output shaft 21 in the driving motor 20, wherein a second bevel gear 23 is engaged with the one end face of the first bevel gear 22; wherein a rotating rod 24 penetrates through and is set on the second bevel gear 23; connection cavities 67 with the opening towards outside are symmetrically disposed in two sides of the first transmission cavity 19; wherein the two end faces of the rotating rod 24 respectively penetrate through the first transmission cavity 19 and stretch into the connection cavities 67 and are fixedly connected with couplings 25 respectively; wherein one end, away from the first transmission cavity 19, of the coupling 25, is fixedly connected with a connecting shaft 26; spring grooves 27 symmetrically set in two sides of the base 10 on the upper side of the fixed block 37, wherein a slider 28 is set in the spring groove 27; a compression spring 29 fixedly arranged on the upper end face of the slider 28, wherein the other end of the compression spring 29 is fixedly connected to the upper end face of the spring groove 27; wherein a connection rod 30 is fixedly set at the middle of the lower end face of the slider 28, wherein a connection block 31 is fixedly connected to the lower end face of the connection rod 30, wherein a communicated cavity 32 with an opening facing downwards is set in the connection block 31, wherein communicated first slots 33 are symmetrically disposed in the connection block 31; wherein one end, away from the coupling 25, of the connecting shaft 26, penetrates through the first slot 33 and the cavity 32 and is rotationally connected with the connection block 31 through a bearing; a first gear 34 fixedly set on the connecting shaft 26, wherein a second gear 36 is engaged with the lower end face of the first gear 34; a second slot 35 which communicates with two sides arranged on the lower side of the first slot 33, wherein one end, close to the fixed block 37, of the rotating shaft 17, penetrates through the second slot 35 and the second gear 36 and is rotationally connected with the connection block 31 through a bearing; first grooves 38 with upward openings symmetrically disposed in the two sides of the upper end face of the base 10, wherein a first fixed rod 39 is fixedly set between two end walls of the first grooves 38; a first rotating handle 40 rotationally connected to the first fixed rod 39; a first sliding groove 41 arranged between the first grooves 38; a first slide rail 42 fixedly set on the lower end wall of the first sliding groove 41, wherein symmetrical first sliders 43 are in slide fit with the first slide rail 42, wherein a second rotating handle 44 is rotationally connected to the first slider 43; a guide chute 45 communicated with the one side of the first sliding groove 41; a sliding groove 46 communicated with the one side of the guide chute 45; a first slide toothed rack 48 fixedly set on the one end face of the first slider 43 on the one side; a second slide toothed rack 47 fixedly set on the one end face of the first slider 43 on the other side, wherein a mesh gear 49 driven by a motor is engaged between the one end face of the second slide toothed rack 47 and the other end face of the first slide toothed rack 48.

Beneficially, a machine body 50 is set on the upper side of the base 10, wherein second grooves 51 with downward openings are symmetrically disposed in two sides of the lower end wall of the machine body 50, wherein a second fixed rod 52 is fixedly set between the two end walls of the second groove 51; a third rotating handle 53 is rotationally connected to the second fixed rod 52, and a second sliding groove 55 is arranged between the second grooves 51, wherein the upper end wall of the second sliding groove 55 is fixedly provided with a second slide rail 54, and symmetrical second sliders 56 are in slide fit with the second slide rail 54, and a fourth rotating handle 57 is rotationally connected to the second slider 56; the first rotating handle 40 is rotationally connected with the fourth rotating handle 57 through a connection rotating handle, and the second rotating handle 44 is rotationally connected with the third rotating handle 53 through a connection rotating handle; a turning motor 58 is fixedly set in the upper end face of the machine body 50; a rotary body 59 is set on the upper side of the machine body 50, wherein an inner tooth space 60 is set in the rotary body 59, and a turning gear 62 is engaged with the inner tooth space 60; a turning shaft 61 is fixed to the upper end face of an output shaft in the turning motor 58, wherein the upper end face of the turning shaft 61 penetrates through the rotary body 59, and stretches into the inner tooth space 60 and is fixedly connected with the turning gear 62; a slide cavity 64 is set on the upper side of the inner tooth space 60, and a slide fixed rod 65 is fixedly arranged between two end walls of the slide cavity 64, wherein symmetrical moving blocks 66 are in sliding fit connection with the slide fixed rod 65, wherein Z-shaped clamping plates 73 are respectively and fixedly set on the end faces of the two moving blocks 66; a first toothed rack 68 extending towards one side is fixedly arranged on the upper end face of the moving block 66 on the one side, and a second fixed block 69 is fixedly set on the upper end face of the moving block 66 on the other side, wherein a second toothed rack 70 extending towards one side is fixedly set on the one end face of the second fixed block 69; a transmission block 72 is fixedly set at the middle of the upper end wall of the slide cavity 64, and a transmission groove 71 which penetrates from one side to the other side is set in the transmission block 72; a transmission gear 75 is set in the transmission groove 71; a transmission motor 77 is fixedly set in the upper end wall of the slide cavity 64; a rotary shaft 76 is fixedly connected to the lower end face of an output shaft in the transmission motor 77, wherein the lower end face of the rotary shaft 76 penetrates through the transmission gear 75 and is rotationally connected with the lower end wall of the transmission groove 71; the one end face of the first toothed rack 68 engages with the one end face of the transmission gear 75, and the one end face of the second toothed rack 70 engages with the other end face of the transmission gear 75; a binding post 78 is fixedly set on the upper end face of the rotary body 59, wherein a stabilizing block 79 is fixedly arranged on the binding post 78, and an infrared detector 80 is fixedly disposed on the stabilizing block 79; a heat dissipating groove 82 is communicated with the upper side of the slide cavity 64, wherein the heat dissipating groove 82 communicates with the slide cavity 64 and the outer space, wherein a cooling fin 83 is fixedly set in the heat dissipating groove 82, and a dust filter gauze 84 is fixedly set on the upper side of the cooling fin 83.

Beneficially, the height of the Z-shaped clamping plates 73 is equal to the height between the slide fixed rod 65 and the ground when the lower end face of the machine body 50 abuts against the upper end face of the base 10; slide-proof rugs 731 are fixedly arranged on the opposite end faces of the symmetrical Z-shaped clamping plates 73, and when machine body 50 is not lifted in the initial state, the Z-shaped clamping plates 73 may carry the cargoes on the ground, and the slide-proof rug improves the clamping effect of the device.

Beneficially, a plurality of ball grooves 101 are set in the end face, where the machine body 50 abuts against the rotary body 59, wherein the ball grooves 101 are provided with balls 102 which improves the flexibility of the device, so that the phenomenon may be avoided that the device is prone to being damaged when the machine body abuts against the rotary body and causes friction, so that the service life of the device may be prolonged, and the flexibility of the device will be improved.

Beneficially, when in the initial state, the connecting shaft 26 and the coupling 25 are fixedly connected to each other but are in a relaxed state, so that under the condition that the coupling 25 is fixed, the connecting shaft 26 may move up and down driven by the scroll wheel 18 and the normal transmission may not be affected, therefore the coordination of the device may be improved.

The specific use mode: when the invention is in the working process, the position of the cargoes may be scanned by the infrared detector 80, and the driving motor 20 is operated to drive the first bevel gear 22 to rotate; the second bevel gear 23 drives the rotating rod 24 to rotate, and the first gear 34 is rotated through the transmission of the coupling 25 and the connecting shaft 26, so that the second gear 36 drives the scroll wheel 18 to rotate, thereby driving the device to move to the position where the cargoes need to be carried, and then the driving motor 20 is stopped; during the movement of the device, when it comes to the circumstances that the road is rugged, in order to prevent the situation when the scroll wheel 18 on the one side is pushed by the obstacles to make one side lifted, the air valve 14 on the lifted side is turned on to reduce the inner air pressure, and then the piston 13 on the one side moves upward to drive the scroll wheel 18 to adjust in the height direction; at the same time, the connection block 31 is driven to push upward, and at this time the slider 28 in the spring groove 27 is buffered and adjusted through the compression spring 29, so that the balance of the device may be maintained. The coupling 25 and the connecting shaft 26 are tensioned so that the first gear 34 still remains in a rotating state, so that the scroll wheel 18 continues to rotate forwards; and then the air valve 14 is turned off after the scroll wheel 18 crosses the obstacle, and the air pump 12 is operated to inflate air into one side of which the air pressure is reduced to keep the air pressure balance, so that the device can continuously and stably move to the cargo position. And then the transmission motor 77 works to drive the transmission gear 75 to rotate, and the first toothed rack 68 drives moving block 66 on one side to move to the other side, and the second toothed rack 70 drives the moving block 66 on the other side to move to one side, and then the Z-shaped clamping plates 73 move towards each other to clamp the middle cargoes; if long-distance carrying is needed, the driving motor 20 drives the scroll wheel 18 to rotate, so that the goods are carried to a remote position; and then the transmission motor 77 rotates reversely, making the Z-shaped clamping plates 73 move reversely, and then the cargoes are put down; if the goods need to be carried in different heights or directions at the same position, the mesh gear 49 driven by the motor rotates, and the first slide toothed rack 48 drives the first slider 43 on the one side to move towards one side, and the second slide toothed rack 47 drives the first slider 43 on the other side to move to the other side, so that the upper end faces of the symmetrical second rotating handles 44 move upward to push; and at the same time, the first rotating handle 40 on the one side rotates anticlockwise around the first fixed rod 39 on the one side, and the first rotating handle 40 on the other side rotate clockwise around the first fixed rod 39 on the other side, so that the first rotating handles 40 on both sides work together to push the device to move upwards to the height where the cargoes need to be placed to stop; the turning motor 58 is operated to drive the turning gear 62 to rotate, and then the rotary body 59 may rotate by a certain angle according to the position, and then the Z-shaped clamping plates 73 put down the goods to prepare for the next handling.

Compared with the prior art, the benefits of the invention are as follows: when the invention is working, the handling robot may confirm the position of the cargoes and the the position where the cargoes will be placed through the infrared detector, and control the inner motor to drive the movement, rotation, lifting and handling of the device; at the same time, during the movement, the balance and stability of the device may be maintained through the adjustment of the air pressure when it moves on the rugged road surface, and through the transmission of the coupling and the connecting shaft, the device may continue to move when it maintains balance. The invention has the advantages with high level automation, flexibility and high efficiency, and the stability may be maintained when the cargoes are carried.

It is obvious to those skilled in the art that the present invention is not limited to the details of the exemplary embodiments described above, and the present invention can be realized in other specific forms without departing from the spirit or essential characteristics of the invention. Therefore, the present embodiments are to be considered as exemplary and not restrictive from any point of view, and the scope of the invention is defined by the appended claims instead of the description above, therefore all changes which come within the meaning and scope of equivalent elements in claims are included in the present invention.

The invention claimed is:

1. A handling robot control system comprises a base;
an air balance cavity set in the base;
an air pump fixedly arranged at the middle of the air balance cavity;
air valves symmetrically disposed in two sides of the end walls of the air balance cavity;
pistons symmetrically disposed in two sides of the air balance cavity,
wherein piston rods are fixedly set at the middle of lower end faces of the pistons,
wherein lower end faces of the piston rods penetrate through the base and extend into the outer space and are fixedly connected with a support block, and one end face, which is close to the air pump, of the support block is rotationally connected with a rotating shaft,
wherein a scroll wheel is fixedly set on the rotating shaft;
a fixed block fixedly set at the middle of a lower end face of the base,
wherein a first transmission cavity is set in the fixed block,
wherein a driving motor is fixedly disposed in the first transmission cavity;
wherein a first bevel gear is fixedly arranged on a lower end face of an output shaft in the driving motor,
wherein a second bevel gear is engaged with and set on the one end face of the first bevel gear;
wherein a rotating rod penetrates through and is set on the second bevel gear;
connection cavities with the opening towards outside are symmetrically disposed in two sides of the first transmission cavity,
wherein the two end faces of the rotating rod respectively penetrate through the first transmission cavity and stretch into the connection cavities and are fixedly connected with couplings respectively;
wherein one end, away from the first transmission cavity, of the coupling, is fixedly connected with a connecting shaft;
spring grooves symmetrically set in two sides of the base on an upper side of the fixed block,
wherein a slider is set in the spring groove;
a compression spring fixedly arranged on an upper end face of the slider,
wherein the other end of the compression spring is fixedly connected to an upper end face of the spring groove;
wherein a connection rod is fixedly set at the middle of a lower end face of the slider,
wherein a connection block is fixedly connected to a lower end face of the connection rod;
wherein a communicated cavity with an opening facing downwards is set in the connection block,
wherein communicated first slots are symmetrically disposed in the connection block;
wherein one end, away from the coupling, of the connecting shaft, penetrates through the first slot and the cavity and is rotationally connected with the connection block through a bearing;
a first gear fixedly set on the connecting shaft,
wherein a second gear is engaged with and is set on a lower end face of the first gear;
a second slot which communicates with two sides arranged on a lower side of the first slot,
wherein one end, close to the fixed block, of the rotating shaft, penetrates through the second slot and the second gear and is rotationally connected with the connection block through a bearing;
first grooves with upward openings symmetrically disposed in the two sides of an upper end face of the base,
wherein a first fixed rod is fixedly set between two end walls of the first grooves;
a first rotating handle rotationally connected to the first fixed rod;
a first sliding groove arranged between the first grooves;
a first slide rail fixedly set on a lower end wall of the first sliding groove,
wherein first sliders in slide fit are symmetrically disposed in two sides of the first slide rail,
wherein a second rotating handle is rotationally connected to the first slider;
a guide chute communicated with the one side of the first sliding groove;

a sliding groove communicated with the one side of the guide chute;
a first slide rack fixedly set on the one end face of the first slider on the one side;
a second slide rack fixedly set on the one end face of the first slider on the other side,
wherein a mesh gear driven by a motor is engaged between the one end face of the second slide rack and the other end face of the second slide rack;
the driving motor is operated to drive the first bevel gear to rotate, and the second bevel gear drives the rotating rod to rotate, and through the transmission of the coupling and the connecting shaft, the first gear is rotated, so that the second gear drives the scroll wheel to rotate, thereby driving the device to move to the position where the cargoes need to be carried.

2. The handling robot control system of claim 1, wherein a machine body is set on an upper side of the base,
wherein second grooves with downward openings are symmetrically disposed in two sides of a lower end wall of the machine body,
wherein a second fixed rod is fixedly set between the two end walls of the second groove;
a third rotating handle is rotationally connected to the second fixed rod, and a second sliding groove is arranged between the second grooves,
wherein an upper end wall of the second sliding groove is fixedly provided with a second slide rail, and symmetrical second sliders are in slide fit with the second slide rail, and a fourth rotating handle is rotationally connected to the second slider;
the first rotating handle is rotationally connected with the fourth rotating handle through a connection rotating handle, and the second rotating handle is rotationally connected with the third rotating handle through a connection rotating handle;
a turning motor is fixedly set in an upper end face of the machine body;
a rotary body is set on an upper side of the machine body, wherein an inner tooth space is set in the rotary body, and a turning gear is engaged with the inner tooth space;
a turning shaft is fixed to an upper end face of an output shaft in the turning motor,
wherein an upper end face of the turning shaft penetrates through the rotary body, and stretches into the inner tooth space and is fixedly connected with the turning gear;
a slide cavity is set on an upper side of the inner tooth space, and a slide fixed rod is fixedly arranged between two end walls of the slide cavity,
wherein symmetrical moving blocks are in sliding fit connection with the slide fixed rod,
wherein Z-shaped clamping plates are respectively and fixedly set on the end faces of the two moving blocks;
a first toothed rack extending towards one side is fixedly arranged on an upper end face of the moving block on the one side, and a second fixed block is fixedly set on an upper end face of the moving block on the other side,
wherein a second toothed rack extending towards one side is fixedly set on the one end face of the second fixed block;
a transmission block is fixedly set at the middle of an upper end wall of the slide cavity, and a transmission groove which penetrates from one side to the other side is set in the transmission block;
a transmission gear is set in the transmission groove;
a transmission motor is fixedly set in the upper end wall of the slide cavity;
a rotary shaft is fixedly connected to a lower end face of an output shaft in the transmission motor,
wherein a lower end face of the rotary shaft penetrates through the transmission gear and is rotationally connected with a lower end wall of the transmission groove;
the one end face of the first toothed rack engages with the one end face of the transmission gear, and the one end face of the second toothed rack engages with the other end face of the transmission gear;
a binding post is fixedly set on an upper end face of the rotary body,
wherein a stabilizing block is fixedly arranged on the binding post, and an infrared detector for scanning the position of the goods is fixedly disposed on the stabilizing block;
a heat dissipating groove is communicated with an upper side of the slide cavity,
wherein the heat dissipating groove communicates with the slide cavity and the outer space,
wherein a cooling fin is fixedly set in the heat dissipating groove, and a dust filter gauze is fixedly set on an upper side of the cooling fin;
the turning motor is operated to drive the turning gear to rotate, and then the rotary body may rotate by a certain angle according to the position, and then the Z-shaped clamping plates put down the goods to prepare for the next handling.

3. The handling robot control system of claim 2, wherein the height of the Z-shaped clamping plates is equal to the height between the slide fixed rod and the ground when the lower end face of the machine body abuts against the upper end face of the base; slide-proof rugs are fixedly arranged on the opposite end faces of the symmetrical Z-shaped clamping plates; when machine body is not lifted, the Z-shaped clamping plates may carry the cargoes on the ground and clamp the cargoes better through the slide-proof rug.

4. The handling robot control system of claim 2, wherein a plurality of ball grooves are set in the end face where the machine body abuts against the rotary body,
wherein the ball grooves are provided with balls, so that the phenomenon may be avoided through balls that the device is prone to being damaged when the machine body abuts against the rotary body and causes friction, therefore the service life of the device may be prolonged.

5. The handling robot control system of claim 1, wherein when in the initial state, the connecting shaft and the coupling are fixedly connected to each other but are in a relaxed state, so that under the condition that the coupling is fixed, the connecting shaft may move up and down driven by the scroll wheel and the normal transmission may not be affected.

* * * * *